(12) United States Patent
Malladi et al.

(10) Patent No.: US 10,073,790 B2
(45) Date of Patent: Sep. 11, 2018

(54) ELECTRONIC SYSTEM WITH MEMORY MANAGEMENT MECHANISM AND METHOD OF OPERATION THEREOF

(71) Applicant: Samsung Electronics Co., Ltd., Suwon-si, Gyeonggi-Do (KR)

(72) Inventors: Krishna T. Malladi, San Jose, CA (US); Hongzhong Zheng, Sunnvyale, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/905,348

(22) Filed: Feb. 26, 2018

(65) Prior Publication Data

US 2018/0181494 A1    Jun. 28, 2018

Related U.S. Application Data

(63) Continuation-in-part of application No. 15/174,986, filed on Jun. 6, 2016, now Pat. No. 9,934,154.

(60) Provisional application No. 62/262,493, filed on Dec. 3, 2015.

(51) Int. Cl.

| | |
|---|---|
| *G11C 5/00* | (2006.01) |
| *G11C 7/00* | (2006.01) |
| *G06F 12/0897* | (2016.01) |
| *G06F 12/0868* | (2016.01) |
| *G06F 3/06* | (2006.01) |
| *G06F 13/16* | (2006.01) |
| *G06F 12/0811* | (2016.01) |

(52) U.S. Cl.
CPC ........ *G06F 12/0897* (2013.01); *G06F 3/0611* (2013.01); *G06F 12/0811* (2013.01); *G06F 12/0868* (2013.01); *G06F 13/1668* (2013.01)

(58) Field of Classification Search
CPC ............. G06F 12/0238; G06F 12/0802; G06F 12/0811; G06F 12/0897; G11C 5/00
See application file for complete search history.

(56) References Cited

U.S. PATENT DOCUMENTS

| | | | |
|---|---|---|---|
| 6,384,439 | B1 | 5/2002 | Walker |
| 6,992,919 | B2 | 1/2006 | Andrei et al. |
| 8,671,263 | B2 | 3/2014 | Jess |
| 8,738,875 | B2 | 5/2014 | Carter et al. |
| 8,861,261 | B2 | 10/2014 | Kim |
| 9,361,970 | B2 | 6/2016 | Schaefer et al. |
| 9,710,226 | B1 * | 7/2017 | Zheng ...................... G06F 5/14 |
| 2004/0183198 | A1 | 9/2004 | Andrei et al. |

(Continued)

*Primary Examiner* — Hien Nguyen
(74) *Attorney, Agent, or Firm* — Perspectives Law Group, Corp.

(57) ABSTRACT

An electronic system includes: a processor configured to access operation data; a high speed local memory, coupled to the processor, configured to store a limited amount of the operation data; and a memory subsystem, coupled to the high speed local memory, including: a module memory controller configured to access the operational data for the processor and the high speed local memory, a local cache controller, coupled to the module memory controller, including a fast control bus configured to store the operation data, with critical timing in a first tier memory, and a memory tier controller, coupled to the local cache controller, including a reduced performance control bus configured to store the operation data with non-critical timing in a second tier memory.

16 Claims, 10 Drawing Sheets

(56) References Cited

U.S. PATENT DOCUMENTS

| | | |
|---|---|---|
| 2008/0175272 A1* | 7/2008 | Fields ................ G06F 12/0831 370/468 |
| 2012/0203999 A1 | 8/2012 | Jess |
| 2012/0300557 A1 | 11/2012 | Kim |
| 2013/0124814 A1 | 5/2013 | Carter et al. |
| 2014/0244896 A1* | 8/2014 | Goss ....................... G06F 3/067 711/103 |
| 2014/0304475 A1 | 10/2014 | Ramanujan et al. |
| 2014/0325136 A1 | 10/2014 | Schaefer et al. |
| 2016/0011965 A1* | 1/2016 | Murphy .............. G06F 12/0246 711/103 |
| 2016/0054933 A1* | 2/2016 | Haghighi .............. G06F 3/0611 711/103 |
| 2016/0188210 A1* | 6/2016 | Tanzawa ............... G06F 3/0604 711/154 |

* cited by examiner

ELECTRONIC SYSTEM WITH MEMORY MANAGEMENT MECHANISM AND METHOD OF OPERATION THEREOF

CROSS REFERENCE TO RELATED APPLICATION(S)

This application is a Continuation-in-Part to U.S. patent application Ser. No. 15/174,986 filed Jun. 6, 2016, and the subject matter thereof is incorporated herein by reference thereto. U.S. patent application Ser. No. 15/174,986 filed Jun. 6, 2016 further claims the benefit of U.S. Provisional Patent Application Ser. No. 62/262,493 filed Dec. 3, 2015, and the subject matter thereof is incorporated herein by reference thereto.

TECHNICAL FIELD

An embodiment of the present invention relates generally to an electronic system, and more particularly to a system for data storage functions for electronic systems.

BACKGROUND

Modern applications require many different performance aspects from data storage devices. For example, high capacity, low latency, high bandwidth and low power are some of the requirements of system builders. Memory technology, such as dynamic random access memory (DRAM), provides many of the above advantages that have made it the primary choice for main memory for decades. However, the above requirements ultimately conflict with one another, and this problem will grow as the technology nodes scale below 10 nm. New memory technologies such as resistive memory promise to deliver many of the above requirements with additional features that include non-volatility and technology scalability. However, such systems also face technical challenges with their write path reliability and endurance shortcomings, making it hard to completely replace DRAM with these technologies.

DRAM capacity has scaled exponentially with the reduction in geometry, but the increasing capacities of application datasets have overrun the technology development. In order to manage the increasing capacities of the application datasets, the number of memory modules must be increased. The increase in the number of memory modules can have a ripple effect in the number of printed circuit boards, power supplies, cooling fans, and a corresponding decrease in system reliability.

Thus, a need still remains for electronic system with memory management mechanism to improve execution reliability and performance in large computing environments. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a processor configured to access operation data; a high speed local memory, coupled to the processor, configured to store a limited amount of the operation data; and a memory subsystem, coupled to the high speed local memory, including: a module memory controller configured to access the operational data for the processor and the high speed local memory, a local cache controller, coupled to the module memory controller, including a fast control bus configured to store the operation data, with critical timing in a first tier memory, and a memory tier controller, coupled to the local cache controller, including a reduced performance control bus configured to store the operation data with non-critical timing in a second tier memory.

An embodiment of the present invention provides a method of operation of an electronic system including: accessing operation data by a processor; storing a limited amount of the operation data in a high speed local memory; accessing the operational data for the processor and the high speed local memory through a module memory controller; storing the operation data, with critical timing, in a first tier memory by a local cache controller; and storing the operation data, with non-critical timing, in a second tier memory by loading the operational data through the local cache controller to a memory tier controller for accessing the second tier memory.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
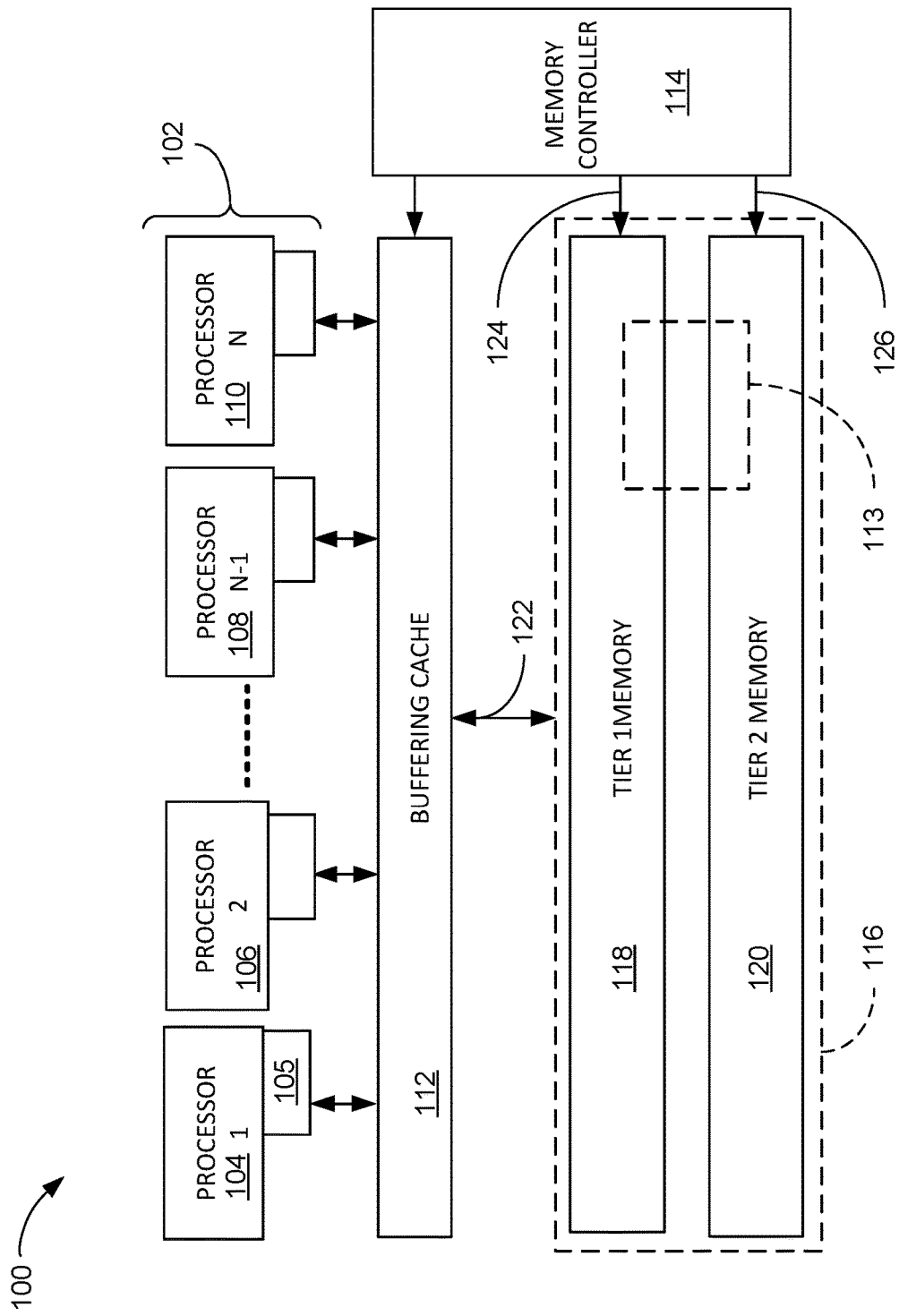
FIG. 1 is an architectural block diagram of an electronic system with a memory management mechanism in an embodiment.

Various embodiments provide an electronic system with memory management to maximize the execution efficiency of the electronic system by establishing a less burdensome I/O architecture. The electronic system can present a tiered memory structure that can have a high speed volatile memory to match system speed requirements and a second tiered memory structure that can be of much greater capacity, but provides less interface speed.

Various embodiments of the electronic system can provide a space and energy efficient architecture for memory management that can accommodate large application databases. The tiered memory structure can be managed by a memory controller that can accommodate the different clock rate structures of the high speed volatile memory and the tiered memory structure.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include a pluggable hardware structure including a mechanical interface structure and a mounting device holding memory packages in an embodiment of the present invention. Further, if a module is written in the apparatus claims section below, the modules are deemed to include hardware circuitry for the purposes and the scope of apparatus claims. Also for example, the hardware can be circuitry, processor, memory, integrated circuit, integrated circuit cores, a pressure sensor, an inertial sensor, a microelectromechanical system (MEMS), passive devices, or a combination thereof.

The term "unit" referred to herein is a circuit formed of hardware components or hardware state machines used for specific functions. The "unit" can be used for timing critical functions and does not necessarily include software functions or support.

Referring now to FIG. 1, therein is shown an architectural block diagram of an electronic system 100 with a memory management mechanism in an embodiment. The electronic system 100 includes a processor array 102 having a first processor 104, a second processor 106, an N-1$^{st}$ processor 108, and an N$^{th}$ processor 110. The processor array 102 can be individual processors in a system, processor cores within a single processor module, or a combination thereof.

Each of the processors in the processor array 102 can access a buffering cache memory 112, such as a volatile memory cache capable of providing operation data 113, such as instructions and data, for all of the processors in the processor array 102. It is understood that the architecture of the first processor 104, the second processor 106, the N-1$^{st}$ processor 108, and the N$^{th}$ processor 110 can each be coupled to a high speed local memory 105, which can function as a proximate cache to service their core. The high speed local memory 105, can be composed of memory structures proximate the cores of the processor array 102, that provides rapid access to instructions and data for execution of the operating system and user applications. The high speed local memory 105 can be configured as a L1, L2, Lm cache used for acceleration of instruction and data fetching. In practice the high speed local memory 105 can be limited to approximately 256 Kbytes. The can high speed local memory 105 can support a limited amount of the operation data 113 due to the support of the processor array 102. The size of the high speed memory 105 can limit the amount of the instructions and the data that can be held in reserve for the execution of the first processor 104, the second processor 106, the N-1$^{st}$ processor 108, or the N$^{th}$ processor 110.

The buffering cache memory 112 can be an external cache for managing the flow of the operation data 113, which can be operating system instructions, application program instructions, user data, or a combination thereof. It is understood that the local cache memory 112 is a memory structure external to the processor array, but in close proximity and dedicated to providing quick access to the be operating system instructions, the application program instructions, the user data, or the combination thereof.

A memory controller 114 can coordinate the transfer of the operation data 113, such as commands and user data, to and from a memory subsystem 116 from and to the local cache memory 112. The memory subsystem 116 can be a single module that includes a first tier memory 118 and a second tier memory 120 each linked to the memory controller and to a memory data bus 122. The operation data 113 can be contained in the first tier memory 118, second tier memory 120, or a combination thereof as a holding point for the processor array 102. The memory controller 114 can be coupled to the first tier memory 118 by a fast control bus 124. The memory controller 114 can be coupled to the second tier memory 120 by a reduced performance control bus 126. It is understood that the memory subsystem 116 can be a single module, such as a dual in-line memory module (DIMM), a multi-chip package, a printed circuit board having multiple memory packages, or a combination thereof.

The memory controller 114 can provide refresh timing to the first tier memory 118 and the second tier memory 120 at the same rate. The construction of the individual bit storage cells can be the same in the first tier memory 118 and the second tier memory 120. In the second tier memory 120, peripheral circuits like local sub-word-line drivers are eliminated, while local bit-line sense amplifiers, and IO lines are optimized for lower area. Even though this results in higher access latency of the second tier memory 120 (i.e. tAA, tAC), it will not affect the refresh timing (tREF) or refresh interval (tREFI). A refresh penalty (tRFC) can be related to activation and precharge timing by the local bit-line sense amplifiers. The optimization of the second tier memory 120 can include the elimination of local sub-word-line drivers and optimization of the local bit-line sense amplifiers, which can increase row address select (RAS) and column address select (CAS) controls latencies respectively, the refresh penalty (tRFC) could go higher for the second tier memory 120 compared to the first tier memory 118. But the more important parameter is the refresh interval tREFI, which is the same for the first tier memory 118 and the second tier memory 120 because, even the increased tRFC is much smaller than tREFI (and tREF).

While the first tier memory 118 and the second tier memory 120 can be fabricated by the same technology, the second tier memory 120 can provide a vastly higher storage capacity in the same die size. The increase in capacity of the second tier memory 120 can be enabled by a lack of address line amplifiers and local sub-word-line drivers, optimization of local bit-line sense amplifiers, and a reduced dependence on metal routing layers. It is understood that the second tier memory 120 can utilize the space liberated by the elimination of the address line amplifiers and of local sub-word-line drivers for additional capacity of individual bit storage cells providing a marked increase in capacity of the second tier memory 120 over that of the first tier memory 118.

The first tier memory 118 can be traditional DRAM memory, which provides high speed access and volumes limited by the geometry of the technology. The first tier memory 118 can, in some example embodiments, utilize up to 30% of the area of a semiconductor die to support the local sub-word-line drivers and local bit-line sense amplifiers in order to reduce the latency of accessing the operation data 113.

The second tier memory 120 can be a new architecture of DRAM technology that can trade a significant increase in capacity for a slightly degraded access time. The second tier memory 120 can utilize the space freed by not implementing the local sub-word-line drivers and optimizing the local bit-line sense amplifiers in order to provide greater than 50% additional storage capacity without increasing the size of the semiconductor die. In order to accommodate the additional capacity, the interconnect of the additional individual bit storage cells can be made through the poly-silicon layer. The use of the poly-silicon layer to interconnect the additional capacity can be performed without impacting the congested metal interconnect layers of the second tier memory 120. Due to the elimination of the local sub-word-line drivers, the poly-silicon interconnects, and optimizing the local bit-line sense amplifiers, the row address select (RAS) and column address select (CAS) controls of the second tier memory 120 require additional time to access the operation data 113 for the memory data bus 122.

In order to accommodate the difference in timing of the RAS and CAS between the first tier memory 118 and the second tier memory 120, the memory controller 114 can provide a primary control bus 124 and a secondary control bus 126. The primary control bus 124 can be coupled to the first tier memory 118 in order to provide the standard timing of the RAS and CAS control lines. The secondary control bus 126 can be coupled to the second tier memory 120 in order to provide an extended timing version of the RAS and CAS control lines.

The combination of the first tier memory 118 and the second tier memory 120 can provide several options not currently available to the processor array 102. Such a combination of the first tier memory 118 and the second tier memory 120 can help in scaling memory subsystem 116 to smaller dimensions while guaranteeing high capacity as well as high performance. While the first tier memory 118 is optimized to provide reduced latency, the second tier memory 120 is optimized to provide increased capacity. Applications that execute on the processor array 102 could use the memory subsystem 116 either as a hardware caching mechanism or a software tiering structure. In the former, the first tier memory 118 acts as a cache of the second tier memory 120 and only the capacity of the second tier memory 120 would be visible to the operating system. In the latter, both the first tier memory 118 and the second tier memory 120 can be visible to the operating system, resulting in higher capacity. However, the operating system would have to implement scheduling changes to enable storing the operation data 113 with critical timing in the first tier memory 118 and the operation data 113 with non-critical timing in the second tier memory 120.

It has been discovered that the electronic system 100 can enhance performance of the processor array 102 by allowing high speed execution of software applications by using the first tier memory 118 as well as providing increased capacity provided by the second tier memory 120. The difference in read and write access time of the first tier memory 118 and the second tier memory 120 can be managed by the memory controller 114 and is completely invisible to the processor array 102. By incorporating the second tier memory 120 in the memory subsystem 116, greater capacity can be achieved without increasing the number of packages and boards. The resultant system can use less energy, require less cooling, and fit in a smaller space than an equivalent capacity of the first tier memory 118.

Figure 2:
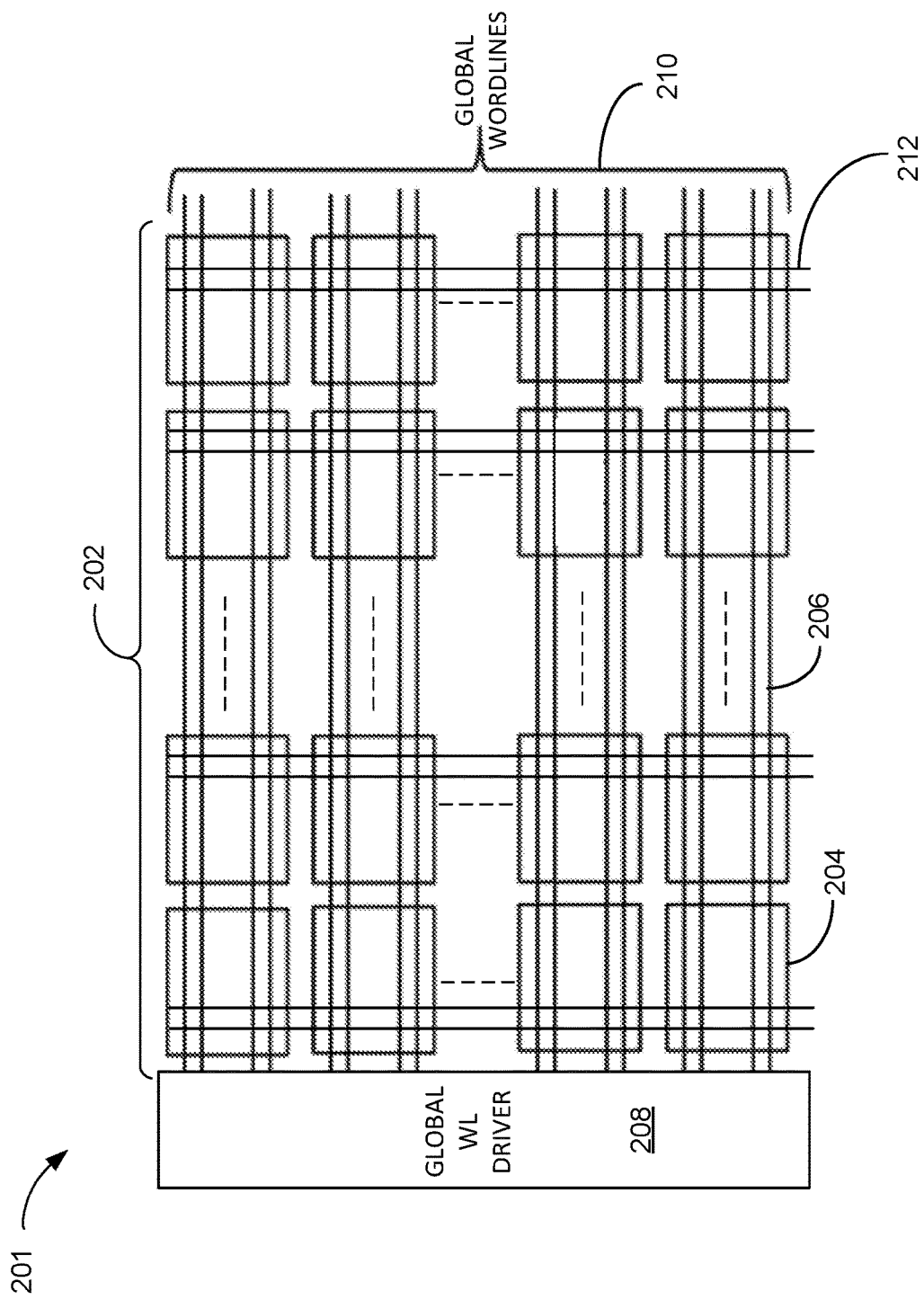
FIG. 2 is an architectural block diagram of a second tier storage array of the second tier memory in an embodiment.

Referring now to FIG. 2, therein is shown an architectural block diagram of a storage cell array of the second tier memory 120 in an embodiment. The architectural block diagram of the second tier storage array 201 depicts a storage cell array 202 having a number of array segments 204 arranged in an N by M rectangular array. There can be a number of word-lines 206 arranged across the N rows of the array segments 204. The word-lines 206 can be driven by a global word-line driver 208 that can control all of the word-lines 206 that address all of the M columns of the array segments 204. The global word-line driver 208 can control the a complete set of global word-lines 210 that each drive all of the array segments 204 in the N rows of the storage cell array 202.

Each of the array segments 204 can include a number of individual bit storage cells (not shown) that are selectively coupled to one of the word-lines 206 driven by the global word-line driver 208. It is understood that there are more of the global word-lines 210 that are shown in the figure. By way of an example, each of the array segments 204 can include five hundred twelve of the word-lines 206 and each of the word-lines 206 can be coupled to five hundred twelve of the individual bit storage cells.

Figure 4:
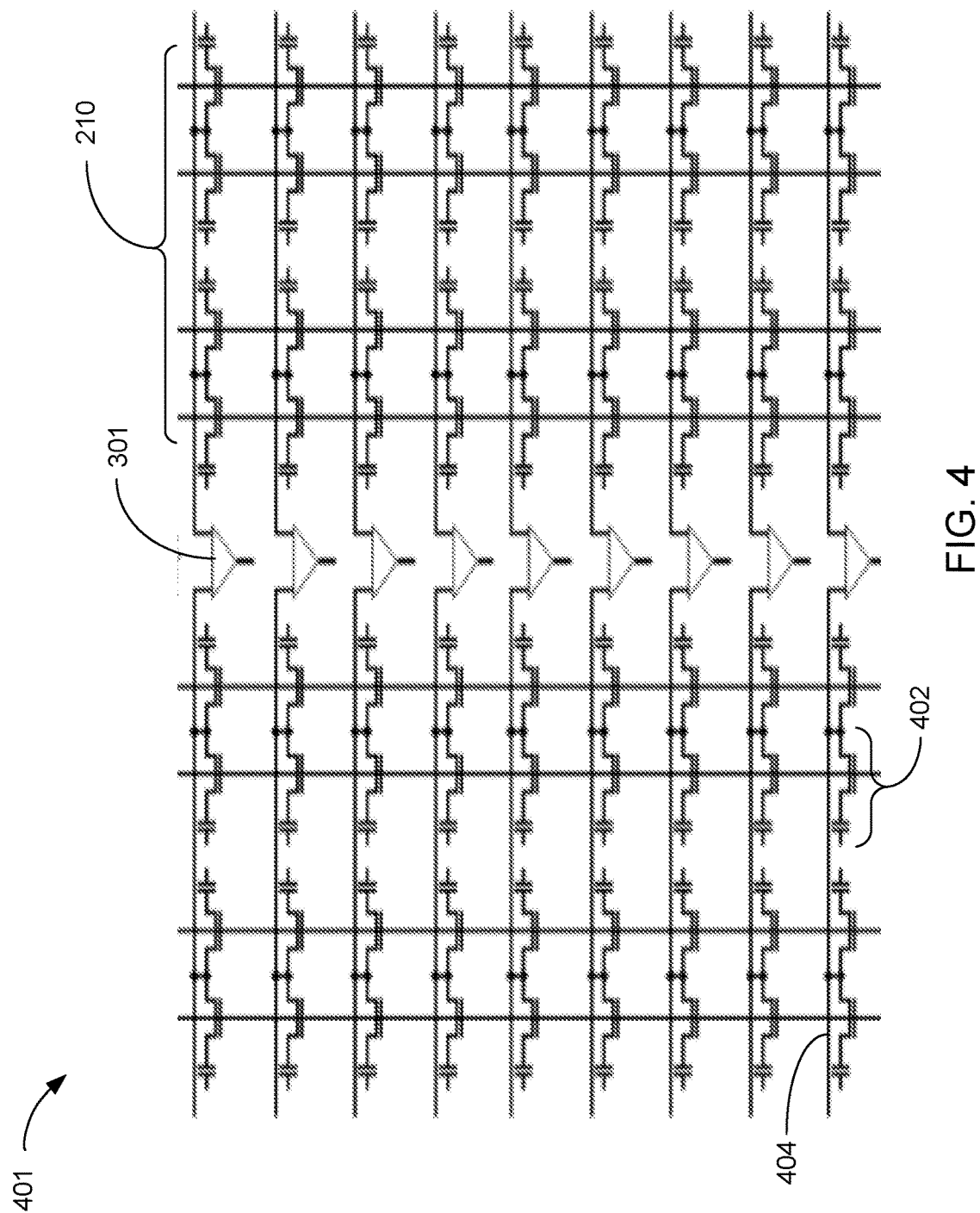
FIG. 4 is a schematic diagram of additional capacity of the second tier memory in an embodiment.

Selective groups of the individual bit storage cells can be coupled to an input of the local bit-line sense amplifier (as shown in FIG. 4) in order to produce a data bit-line 212. It is understood that a portion of the memory address of the second tier memory 120 can selectively enable one of the word-lines 206 as determined by decoding the address provided by the row address select (RAS) signal (not shown). The column address select (CAS) can select only a portion of the data bit-lines 212 enabled by the row address select (RAS) signal.

It has been discovered that an embodiment of the second tier memory 120 provides additional capacity in the second tier storage array 201 by driving the global word-lines 210 directly to the individual bit storage cells. The first tier memory 118 requires additional space within each of the array segments 204 in order to add amplifiers for each of the global word-lines 210 that is coupled to the array segments 204. While the addition of the amplifiers for each of the global word-lines 210 to create local word-lines (not shown) can reduce the latency of the first tier memory 118, they add 5-10% area to each of the array segments 204. The second tier memory 120, in contrast, can utilize the additional space for more of the individual bit storage cells in order to trade additional latency for additional storage capacity.

Figure 3:
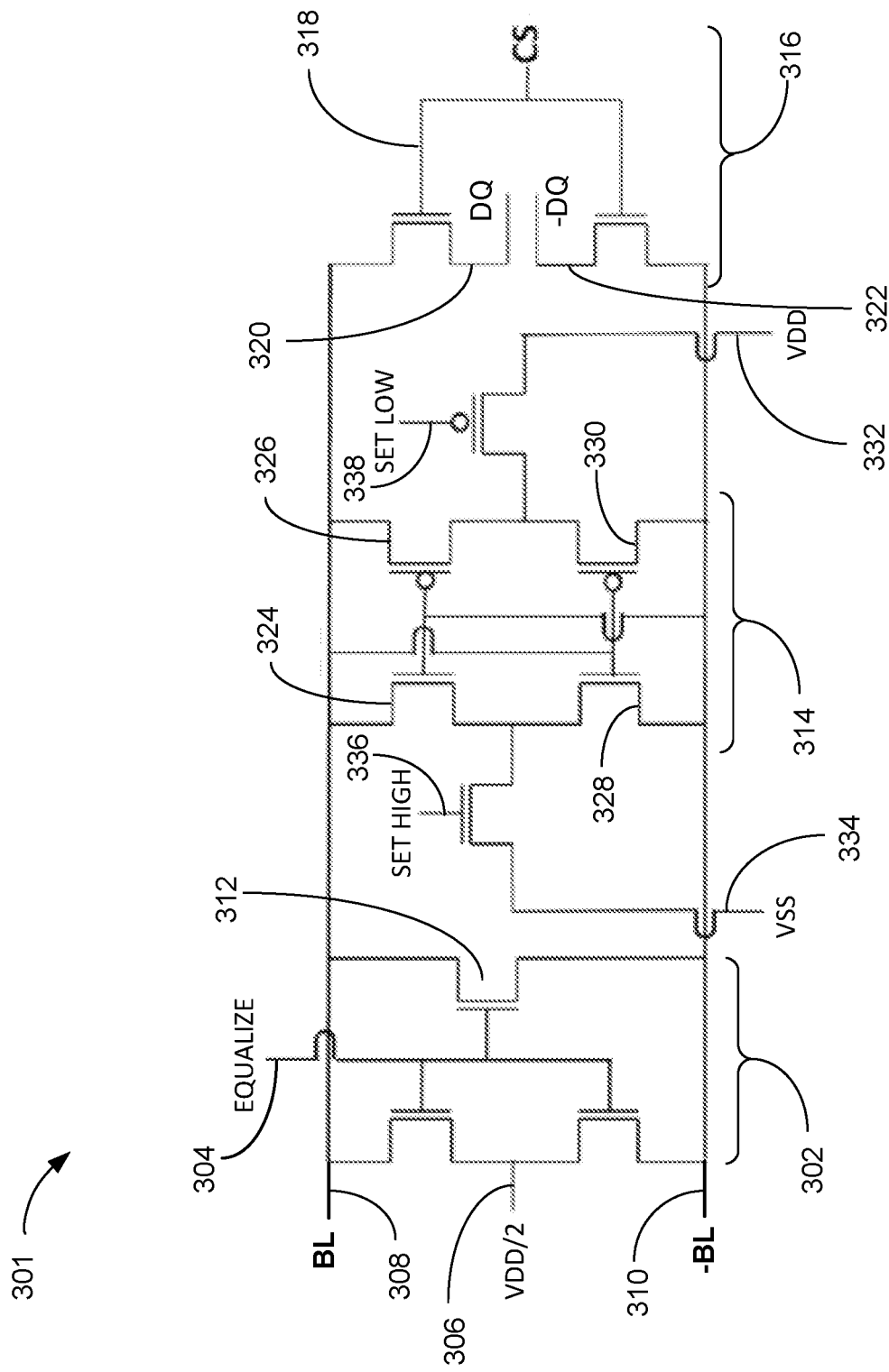
FIG. 3 is a schematic diagram of an optimized local bit-line sense amplifier for the second tier memory in an embodiment.

Referring now to FIG. 3, therein is shown a schematic diagram of an optimized local bit-line sense amplifier 301 for the second tier memory 120 in an embodiment. The schematic diagram of the optimized local bit-line sense amplifier 301 can be resident in each of the array segments 204 of FIG. 2. The optimization of the optimized local bit-line sense amplifier 301 can reduce the width of each of the transistors in order to save area. The optimized local bit-line sense amplifier 301 can save 8-15% over the local bit-line sense amplifier (not shown) of the first tier memory 118 of FIG. 1. It is understood that transistors with a narrower width can take-up less area, but also conduct less current. In this way, the optimized local bit-line sense amplifier 301 can save area, but adds to the latency of the operation of the circuitry.

The schematic diagram of the optimized local bit-line sense amplifier 301 depicts a bit-line precharge circuit 302 including three N-channel MOSFET's controlled by an equalize control 304. When the equalize control 304 is asserted a VDD/2 voltage 306 can be gated to both a bit-line (BL) 308 and a complimentary bit-line (-BL) 310. A shunt transistor 312 can make sure the voltage in both the BL 308 and the -BL 310 is equal. In an embodiment, the VDD can be equal to 3.3V and when the equalize control 304 is asserted, both BL 308 and -BL 310 can be equal to 1.65V. The additional capacity provided in the second tier memory 120 can utilize a poly-silicon layer for forming the BL 308 and the -BL 310.

A bit-line feedback circuit 314 can be used during writing of the individual bit storage cells (not shown) and during refresh processing. The output of the optimized local bit-line sense amplifier 301 can be a bit-line follower 316, which can be activated by asserting a chip select (CS) 318. The current state of the BL 308 and the -BL 310 can be passed to the memory data bus 122 of FIG. 1 through a data output (DQ) 320 and a complimentary data output (-DQ) 322, respectively.

The bit-line feedback circuit 314 can be a CMOS latch which in an embodiment can include a set of 2 inverters connected to each other—the easier way to visualize is by looking perpendicularly such that a top NMOS transistor 324 and a top PMOS transistor 326, with both of their gates connected, can be viewed as a first CMOS inverter. This node is then connected to the drain/source node of a bottom NMOS transistor 328 and a bottom PMOS transistor 330, which form a 2nd CMOS inverter at the bottom in the current figure. Similarly the common gate of the bottom CMOS inverter is connected to the source/drain of the first CMOS inverter.

Prior to reading the BL 308 and the -BL 310, the equalize control 304 can be asserted in order to pre-charge both the BL 308 and the -BL 310 to the VDD/2 voltage 306. During bit read out from an individual storage cell, BL 308 and -BL 310 charge in opposite directions—the optimized local bit-line sense amplifier 301 amplifies this voltage difference by pulling the voltages further apart from each other until they are charged to Vdd 332 and Vss 334. During the read of the individual storage cell, the BL 308 can be at a first read voltage Vdd/2+delta and the -BL 310 can be at a second read voltage Vdd/2-delta. Where the delta voltage represents the value of the bit stored in the individual storage cell.

By way of an example, the bottom inverter's gate can be Vdd/2+delta at which point it begins to turn on the bottom NMOS transistor 328 more—thereby pulling the -BL 310 towards Vss 334 when the control line set_high 336 is asserted which provides positive feedback to the first CMOS inverter turning on the top PMOS transistor 326 more and charging BL 308 towards VDD 332 when the control line set_low 338 is asserted. Finally, after a finite time, this positive feedback finalizes the inverter's voltage such that BL 308 and -BL 310 are at Vdd 332 and Vss 334 respectively, indicating the stored bit being read has a value of Zero and thereby amplifying the original small values. When CS 318 is asserted the values of BL 308 and -BL 310 voltages are transferred to DQ 320 and -DQ 322 respectively.

By way of an example, an order of operations can include:
1) BL 308 and -BL 310 can be pre-charged to the VDD/2 voltage 306
2) bit value stored in the individual storage cell can bias BL 308 and -BL 310
3) positive feedback forces BL 308 and -BL 310 to Vdd 332 or Vss 334
4) CS 318 asserted causes DQ 320 and -DQ 322 to reflect BL 308 and -BL 310
5) set_high 336 and set_low 338 are negated to isolate BL 308 and -BL 310
6) equalize 304 is asserted to pre-charge BL 308 and -BL 310 to the VDD/2 voltage 306 in preparation for reading the next bit value.

It has been discovered that the optimized local bit-line sense amplifier 301 can reduce the area used in the array segments 204, but also increases the operational latency of the second tier memory 120. It is understood that the space saved in the array segments 204 by implementing the optimized local bit-line sense amplifier 301 can be used to add more of the individual bit storage cells in order to trade additional latency for additional storage capacity.

Referring now to FIG. 4, therein is shown a schematic diagram of additional capacity 401 of the second tier memory 120 in an embodiment. The schematic diagram of the additional capacity 401 includes an array of individual storage cells 402 arranged around the optimized local bit-line sense amplifier 301. A poly-silicon interconnect 404 can be used to couple the individual storage cells 402 to the optimized local bit-line sense amplifier 301. The poly-silicon interconnect 404 is formed in the poly-silicon layer of the integrated circuit manufacturing process. The poly-silicon layer can be located below the metal layers in the semiconductor process and represents a higher resistance value that the metal layers.

It is understood that the array of the individual storage cells 402 can be only a portion of the additional capacity 401. The individual storage cells 402 are the same throughout the second tier memory 120. The additional capacity 401 differs from the standard capacity because the poly-silicon interconnect 404 can be used to form the BL 308 of FIG. 3 and -BL 310 of FIG. 3.

It is further understood that the combination of the poly-silicon interconnect 404 and the optimized local bit-line sense amplifier 301 can increase the latency of the second tier memory 120. The increased latency of the second tier memory 120 can prevent the second tier memory 120 from being capable of accessing the operation data 113 of FIG. 1 that is timing critical. The additional capacity 401 can allow the second tier memory 120 to accommodate larger data sets by limiting the number of the first tier memory 118 that is required to support the system requirement. The second tier memory 120 can help limit the system space, power requirements, and system cooling, while accommodating the large data sets.

Figure 5:
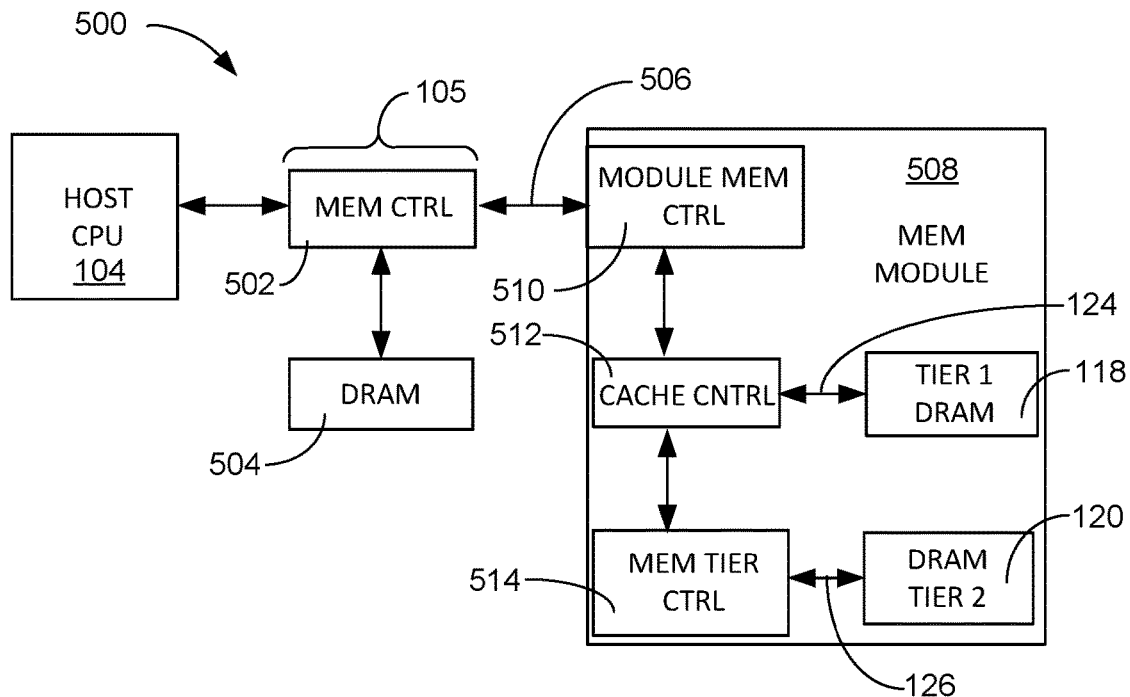
FIG. 5 is an architectural block diagram of an electronic system with a memory management mechanism in a second embodiment.

Referring now to FIG. 5, therein is shown an architectural block diagram of an electronic system 500 with a memory management mechanism in a second embodiment. The architectural block diagram of the electronic system 500 depicts the first processor 104 coupled to the high speed local memory 105, including a memory controller 502 coupled to a high speed memory 504, such as a dynamic random access memory (DRAM).

A transactionally coherent interface 506 can couple the high speed local memory 105 to a memory subsystem 508. The transactionally coherent interface 506 can provide a continuation of the high speed local memory 105 and can be configured as a hardware caching device, a software tiering device, or integrated memory. The transactionally coherent interface 506 can support any of these implementations.

The memory subsystem 508 can include a module memory controller 510 to interface through the transactionally coherent interface 506 to the memory controller 502 or directly to the first processor 104. The memory subsystem 508 can act as a primary storage device with built-in hardware caching, a tiered storage device, or high capacity storage device.

The module memory controller 510 can be a port controller that is configured to enable the caching, tiering, or high capacity storage. The module memory controller 510 can be coupled to a local cache controller 512 that manages the fast control bus 124 to access the first tier memory 118. The local cache controller 512 can support a pass-through mode that accesses a memory tier controller 514 for accessing the second tier memory 120 through the secondary control bus 126, which is a reduced performance bus. The high capacity of the second tier memory 120 can be provided by limited buffering of address and control lines within the second tier memory 120.

The module memory controller 510 can be aware of the performance differences between the first tier memory 118 and the second tier memory 120. In a hardware caching configuration, the local cache controller 512 utilize the entire capacity of the first tier memory 118 to cache the data that is stored in the second tier memory 120. The module memory controller 510 can manage the timing differences for cache hits and cache misses. The local cache controller 512 and the memory tier controller 514 can communicate timing requirements, for accessing data, to the module memory controller 510 without involvement of the first processor 104.

In a software tiering configuration, the module memory controller 510 can pass configuration and tiering policies to the local cache controller 512 and the memory tier controller 514. The tiering of the data between the first tier memory 118 and the second tier memory 120 can be implemented through control of the first processor 104 or the tiering policies configured in the module memory controller 510. If the first processor 104 manages the software tiered memory, the module memory controller 510 can exposes the presence of first tier memory 118 and the second tier memory 120 to the operating system of the first processor 104.

With the memory subsystem 508 configured as a high capacity device, the module memory controller 510 can pass the data commands to the local cache controller 512 and the memory tier controller 514 as a way to access the entire capacity of the first tier memory 118 and the second tier memory 120. The first processor 104 can manage the memory subsystem 508 as a single continuous capacity behind the module memory controller 510.

It has been discovered that the memory subsystem 508 can improve the performance and capabilities of the first processor 104 by providing hardware caching, software tiering of data, or increased capacity. The changes in performance between the first tier memory 118 and the second tier memory 120 are managed by the module memory controller 510 without impacting the first processor with additional overhead. It is understood that the memory subsystem 508 can be implemented on a printed circuit board, a dual in-line memory module (DIMM), or distributed among different devices without limiting the invention.

Figure 6:
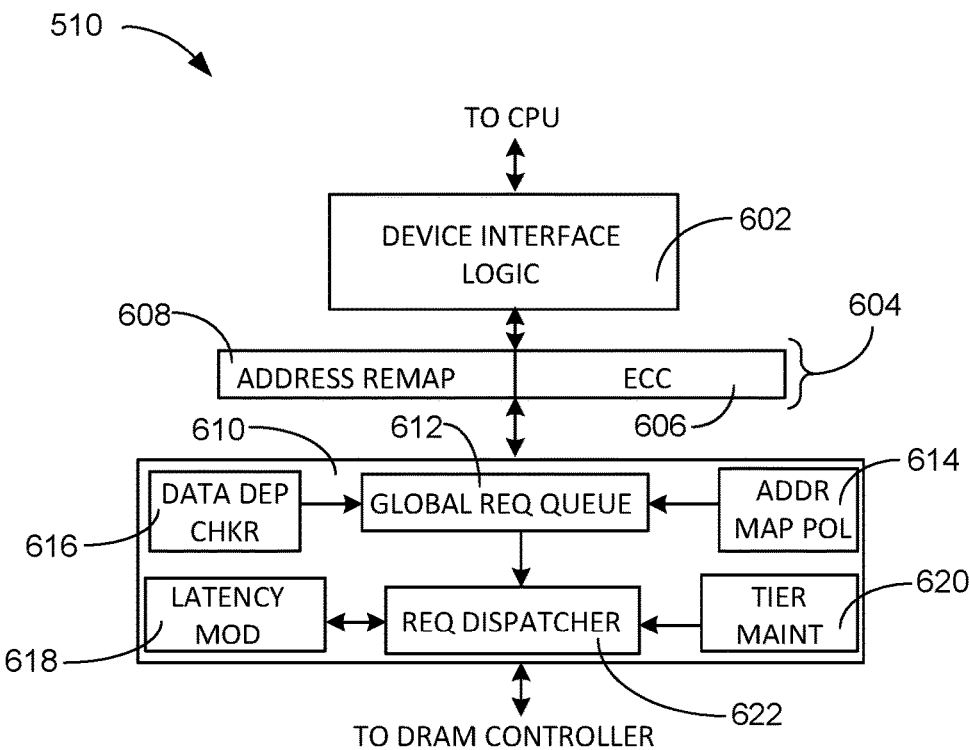
FIG. 6 is an architectural block diagram of a module memory controller in an embodiment.

Referring now to FIG. 6, therein is shown an architectural block diagram of a module memory controller 510 in an embodiment. The module memory controller 510 can include a device interface logic 602 that can support the implementation of the memory subsystem 508 of FIG. 5. The device interface logic 602 can be implemented with discrete electronic components, as part of an application specific integrated circuit, or discrete packaged components. The device interface logic 602 can support a dedicated interface, such as the quick path interconnect (QPI), the NVDIMM-P standard for DDR-5 memories, peripheral component interface express (PCI-e), universal serial bus (USB), or the like.

The device interface logic 602 can provide an electrical and logical interface between the first processor 104 of FIG. 1 and an error management block 604 including an ECC module 606 and an address remap module 608. The error management block 604 can perform error management in both directions through the device interface logic 602.

The ECC module 606 can generate error correction and detection data that can be appended to the data passed through the device interface logic 602 and perform error detection and correction of any data returned by the first tier memory 118 and the second tier memory 120 as shown in FIG. 5. The ECC module 606 can be a hardware block with software support, such as microcode, firmware, or control code.

The address remap module 608 can provide data management and storage control to avoid and address or ranges of address that are prone to errors or have pronounced latencies. The address remap module 608 can be implemented in hardware supported by software to improve operational performance of the second tier memory 120 of FIG. 1 by providing enhanced dynamic bank-mapping for its longer latency. The address remap module 608 can implement per-cache block deduplication to increase the effective capacity of the first tier memory 118 of FIG. 1 and further mask the second tier memory 120 latency.

The error management block 604 can be coupled to a memory capacity management block 610 that can be a hardware structure with software support to implement a global request queue 612, an address mapping policies module 614, a data dependency checker module 616, a latency module 618, a tier maintenance module 620, and a request dispatcher module 622.

The a global request queue 612 can buffer incoming requests and send throttling feedback upstream to indicate the availability of the data from the first tier memory 118 and the second tier memory 120. The global request queue 612 can be a hardware structure managed by a state machine and registers to manage the movement of data requests without adding additional latency to the delivery path.

The address mapping policies module 614 can be hardware registers that hold the latency numbers for the various address ranges in the first tier memory 118 and the second tier memory 120. The address mapping policies module 614 can include non-volatile registers that can be configured during the assembly and manufacturing process of the memory subsystem 508 of FIG. 8

The data dependency checker module 616 can be a hardware structure supported by software. The data dependency checker module 616 can provide additional insight to linked data commands and distribution of the data across the first tier memory 118 and the second tier memory 120.

Figure 8:
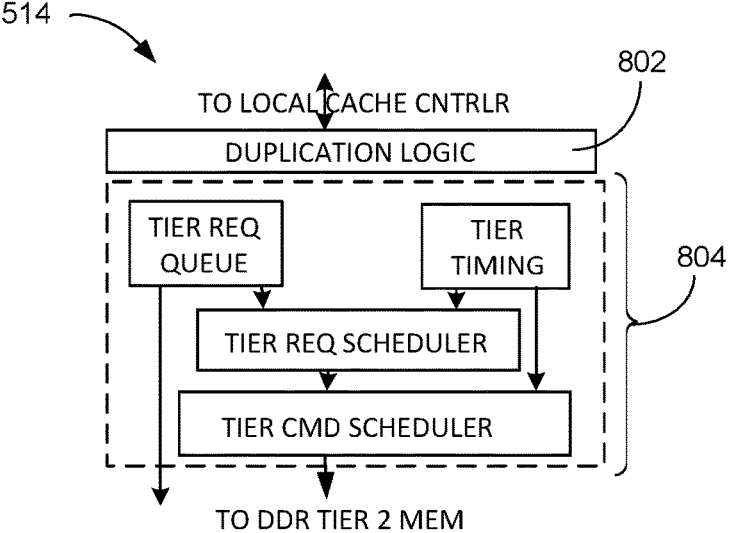
FIG. 8 is an architectural block diagram of the memory tier controller in an embodiment.

The latency module 618 can be a hardware structure that includes non-volatile registers that can be configured during the assembly and manufacturing process of the memory subsystem 508 of FIG. 8. The latency module 618 can provide performance information for the first tier memory 118 and the second tier memory 120 to support the optimized use of the memory subsystem 508.

The tier maintenance module 620 can be a hardware structure supported by software that can maintain status information of the storage pages of the first tier memory 118 and the second tier memory 120. The status can include garbage collection status, wear leveling, and reserve capacity information.

The request dispatcher module 622 can be a hardware structure with a state machine supported by microcode or programmed registers. The request dispatcher module 622 includes a scheduler that issues the data requests to the downstream memory controllers, such as the local cache controller 512 of FIG. 5 and the memory tier controller 514 of FIG. 5. The scheduling policy of the request dispatcher module 622 depends on various factors such as address mapping, bank occupancy, read/write priority, quality of service (QoS) requests, power states and other data dependency issues across the data requests issued by the first processor 104.

It has been discovered that the module memory controller 510 can provide enhanced performance to data storage and retrieval for the first tier memory 118 and the second tier memory 120. The overall performance of the module memory controller 510 can provide performance and flexibility by being configured to support hardware cache, software tiering, or extended capacity to enhance the performance and capabilities of the first processor 104.

Figure 7:
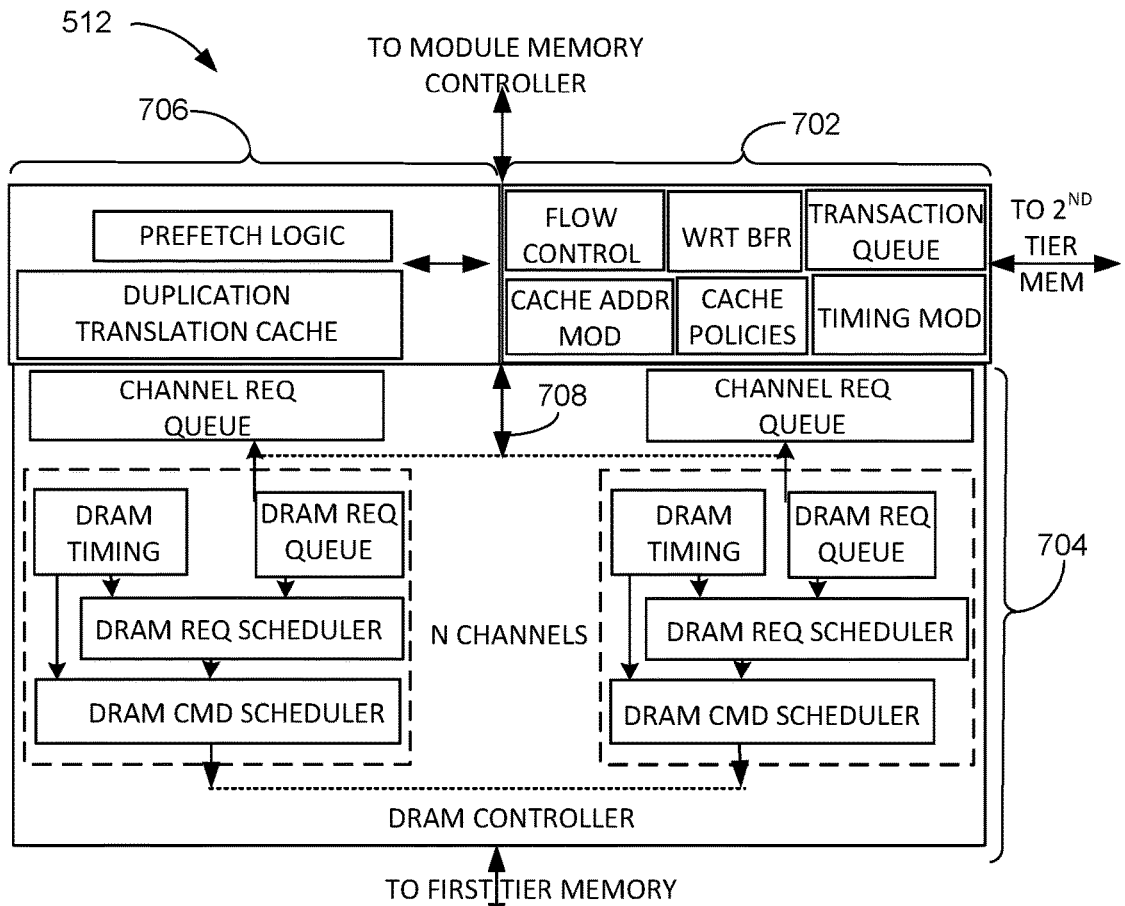
FIG. 7 is an architectural block diagram of the local cache controller in an embodiment.

Referring now to FIG. 7, therein is shown an architectural block diagram of the local cache controller 512 in an embodiment. The architectural block diagram of the local cache controller 512, such as an intelligent DRAM cache controller, includes a cache controller module 702, a DRAM controller module 704, and an intelligent control module 706.

The cache controller module 702 can be a hardware structure with a state machine supported by microcode or programmed registers to implement flow control, a write buffer, transaction queue, cache address module, cache policies module, and timing module. The cache controller module 702 can be configured to support the hardware caching, the software tiering, or the integrated capacity.

The DRAM controller module 704 can be a hardware structure optimized for supporting N channels of the first tier memory 118. The DRAM controller module 704 can include any number of the DRAM support channels required to access the first tier memory 118. The DRAM support channels are optimized to minimize the latency in the data path 708.

The intelligent control module 706 can be a hardware structure supported by software, such as control code, firmware, or microcode. The intelligent control module 706 can provide a prefetch logic module and a duplication translation cache module for managing the cache files for the hardware caching function.

The cache controller module 702 interfaces directly with the global memory controller and receives the memory addresses and read/write transactions. The cache controller module 702 implements standard flow control to throttle upstream requests sent to the module memory controller 510 of FIG. 5. Next, a cache address module identifies the addresses and translates them into index/tag and other cache fields. This addressing scheme also makes efficient choices to map cache lines into the first tier memory 118. By way of an example, the cache address module can map cache line files to different banks to minimize lookup time. The cache policies module provides cache replacement schemes, associativity policy, banking policy, replication and placement to govern the movement and organization of data in the DRAM cache in the first tier memory 118. There is also a large write buffer to sink most of the writes to the downstream second tier memory 120. The transaction queue identifies the independent memory transactions and pushes them into per channel request queues.

The DRAM controller module 704 consists of identical modules per channel to schedule requests efficiently while satisfying all of DRAM timing policies and power management. All other memory controller policies from a standard DDR controller can be implemented in the same place.

The intelligent control module 706 implements the logic to provide flexibility and performance. The prefetch logic module and the deduplication translation cache module can provide minimum latency and maximum flexibility.

It has been discovered that the local cache controller 512 can provide a minimum cache-hit latency. The cache controller module 702 can provide efficient cache-hit ratio and minimize cache-hit latency. The local cache controller 512 provides complete configurability of parameters such as Cache organization, Tag size, Block size, Inclusion vs Exclusion, miss path in order to maintain peak caching performance.

Referring now to FIG. 8, therein is shown an architectural block diagram of the memory tier controller 514 in an embodiment. The architectural block diagram of the memory tier controller 514 depicts a duplication logic module 802 coupled to a tier 2 interface module 804. The duplication logic module 802 can buffer as many of the tier 2 interface module 804 as required to manage the increased capacity of the second tier memory 120 of FIG. 2.

The tier 2 interface module 804 manages all DRAM cache misses and pushes them into a request queue module. The timing and policy module implements all timing constraints for the second tier memory 120 of FIG. 1. The timing of the second tier memory is slowed because of the removal of the peripheral circuits like local sub-word-line drivers, while local bit-line sense amplifiers, and IO lines are optimized for lower area. Even though this results in higher access latency of the second tier memory 120 (i.e. tAA, tAC), it will not affect the refresh timing (tREF) or refresh interval (tREFI). A refresh penalty (tRFC) can be related to activation and precharge timing by the local bit-line sense amplifiers, tRCD, tRAS, tRC parameters are likely longer than the comparable parameters of the first tier memory 118 of FIG. 1.

Figure 9:
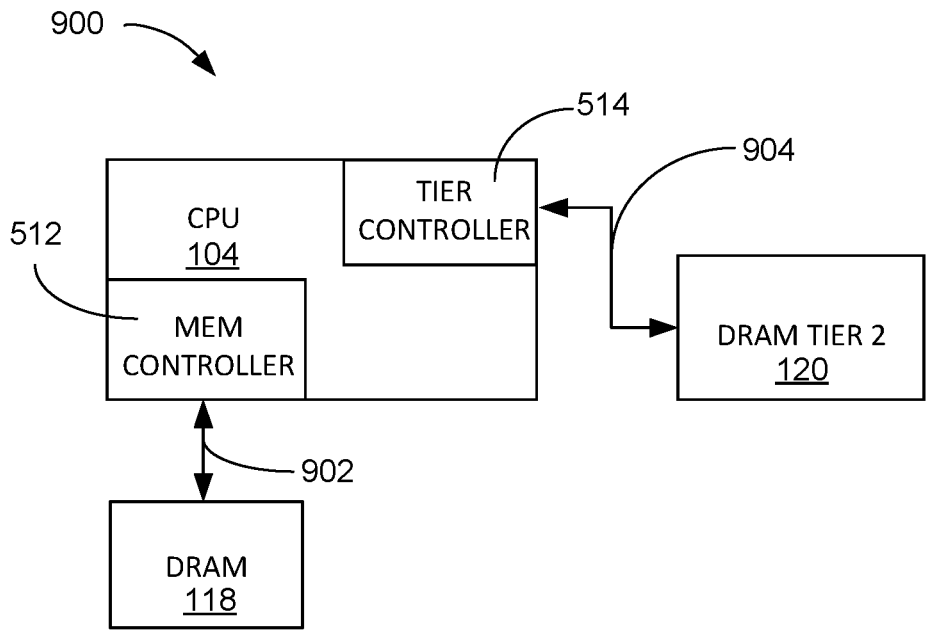
FIG. 9 is an architectural block diagram of an electronic system in a software tiering mechanism in an embodiment.

Referring now to FIG. 9, therein is shown an architectural block diagram of an electronic system 900 in a software tiering mechanism in an embodiment. The architectural block diagram of the electronic system 900 in the software tiering mechanism depicts the first processor 104 having access to the first tier memory 118 and the second tier memory 120 for a software tiering operation.

In the software tiered architecture, similar to hardware cached architecture, both the first tier memory 118 and second tier memory 120 are exposed to the operating system. For ease of configuration, the interface options can include memory bus, QPI, or PCI-e.

The electronic system 900 includes the first processor 104 providing software tiering between the first tier memory 118 and the second tier memory 120. A first interface 902 can be a memory bus, QPI, or PCI-e between the local cache controller 512 and the first tier memory 118. The first processor 104 can be coupled to the second tier memory 120 through the tier memory controller 514 and a second interface 904. The second interface 904 can support a local or remote memory. The first processor 104 can manage the software tiering of data between the first tier memory 118 and the second tier memory 120.

Figure 10:
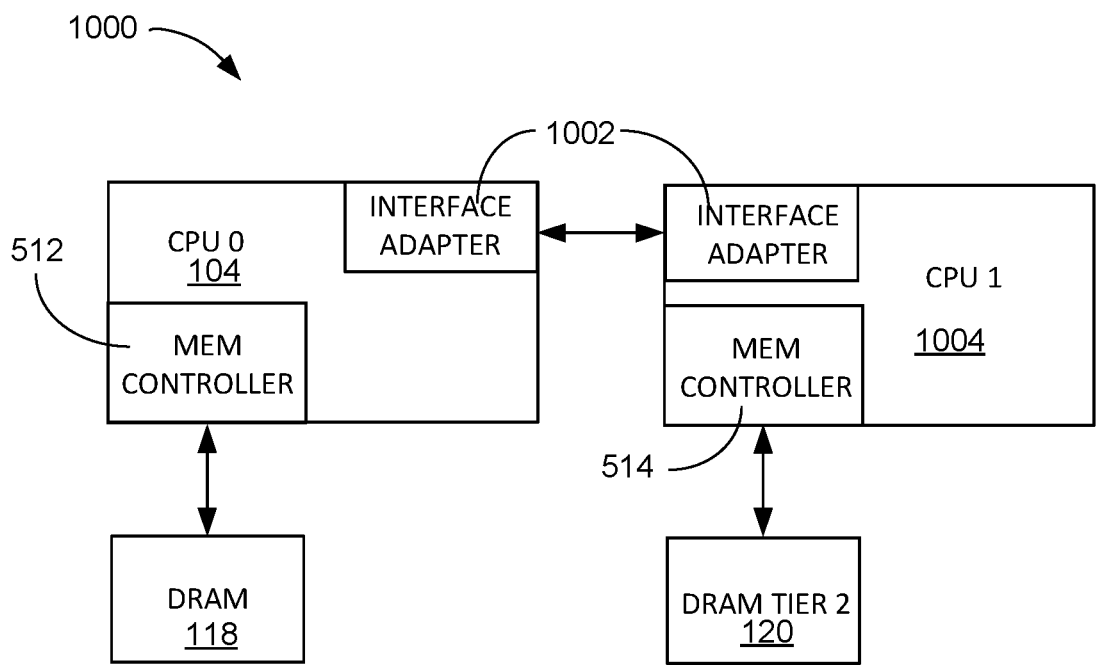
FIG. 10 is an architectural block diagram of an electronic system in a remote software tiering mechanism in an embodiment.

Referring now to FIG. 10, therein is shown an architectural block diagram of an electronic system 1000 in a remote software tiering mechanism in an embodiment. The architectural block diagram of the electronic system 1000 depicts the first processor 104 having the local cache controller 512 coupled to the first tier memory 118. The first processor 104 can perform tiering operations between the first tier memory 118 and the second tier memory 120.

An interface adapter 1002 can provide inter-processor communication between the first processor 104 and a remote processor 1004. The interface adapter 1002 can support any low latency communication structure that can span the distance between the first processor 104 and the remote processor 1004. In an embodiment the communication across the interface adapter 1002 can include optical channel, quick path interconnect (QPI), the NVDIMM-P standard for DDR-5 memories, peripheral component interface express (PCI-e), or universal serial bus (USB).

The operations between the first tier memory 118 and the second tier memory 120 can be coordinated by the first processor 104 and the remote processor 1004 across the interface adapters 1002. The additional latency of the communication path can be configured in the local cache controller 512 and the memory tier controller 514.

It has been discovered that the electronic system 1000 can perform software tiering across the first tier memory 118 and the second tier memory 120, each managed by a different processor and in either a local or remote environment. It is understood that the local cache controller 512 and the memory tier controller 514 can be configured to account for the additional latency of the interface adapter 1002.

Figure 11:
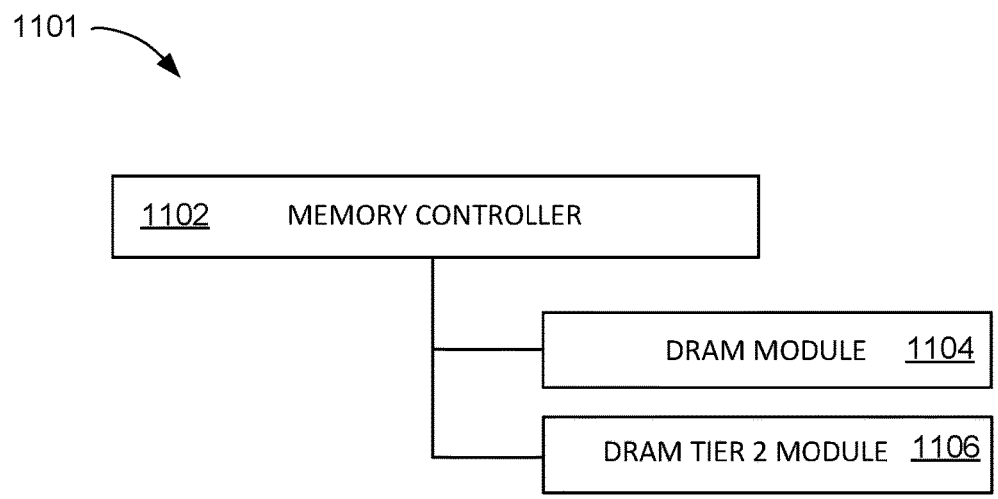
FIG. 11 is a functional block diagram of an integrated memory in an embodiment.

Referring now to FIG. 11, therein is shown a functional block diagram of an integrated memory 1101 in an embodiment. The functional block diagram of the integrated memory 1101 depicts the module memory controller 1102 configured to communicate with a DRAM module 1104 and a DRAM Tier 2 module 1106.

The DRAM module 1104 can be support the first tier memory 118 of FIG. 1 on a common channel within the module memory controller 1102. The DRAM Tier 2 module 1106 can support the second tier memory 120 of FIG. 1 on the same common channel as the DRAM module 1104. While the latency or the DRAM module 1104 and the DRAM Tier 2 module 1106 are different, the refresh rates and support processes are the same.

Figure 12:
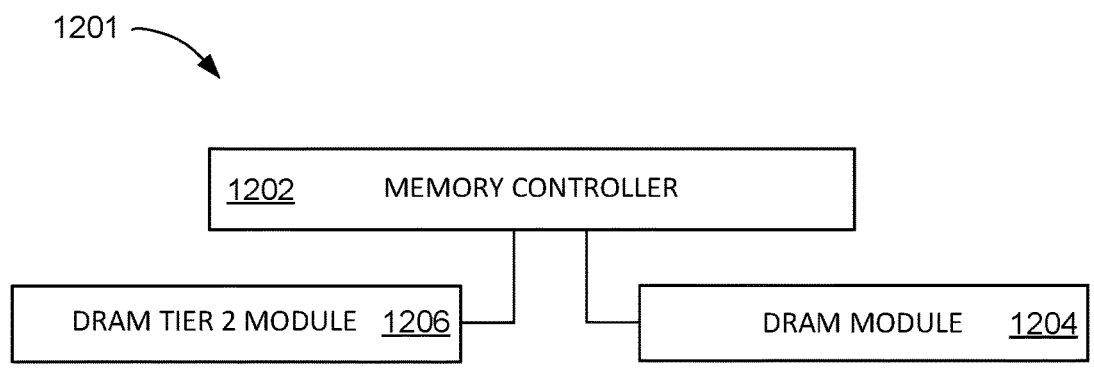
FIG. 12 is a functional block diagram of an integrated memory in an alternative embodiment.

Referring now to FIG. 12, therein is shown a functional block diagram of an integrated memory architecture 1201 in an alternative embodiment. The functional block diagram of an integrated memory architecture 1201 depicts the module memory controller 1202 configured to communicate with a DRAM module 1204 and a DRAM Tier 2 module 1206.

The DRAM module 1204 can be support the first tier memory 118 of FIG. 1 on a dedicated channel within the module memory controller 1202. The DRAM Tier 2 module 1206 can support the second tier memory 120 of FIG. 1 on a different dedicated channel as the DRAM module 1104. While the latency or the DRAM module 1104 and the DRAM Tier 2 module 1106 are different, the refresh rates and support processes are the same. By using the dedicated channels in the module memory controller 1202, the timing of channel operations are easier to manage, but latency of the operations can be complicated.

Figure 13:
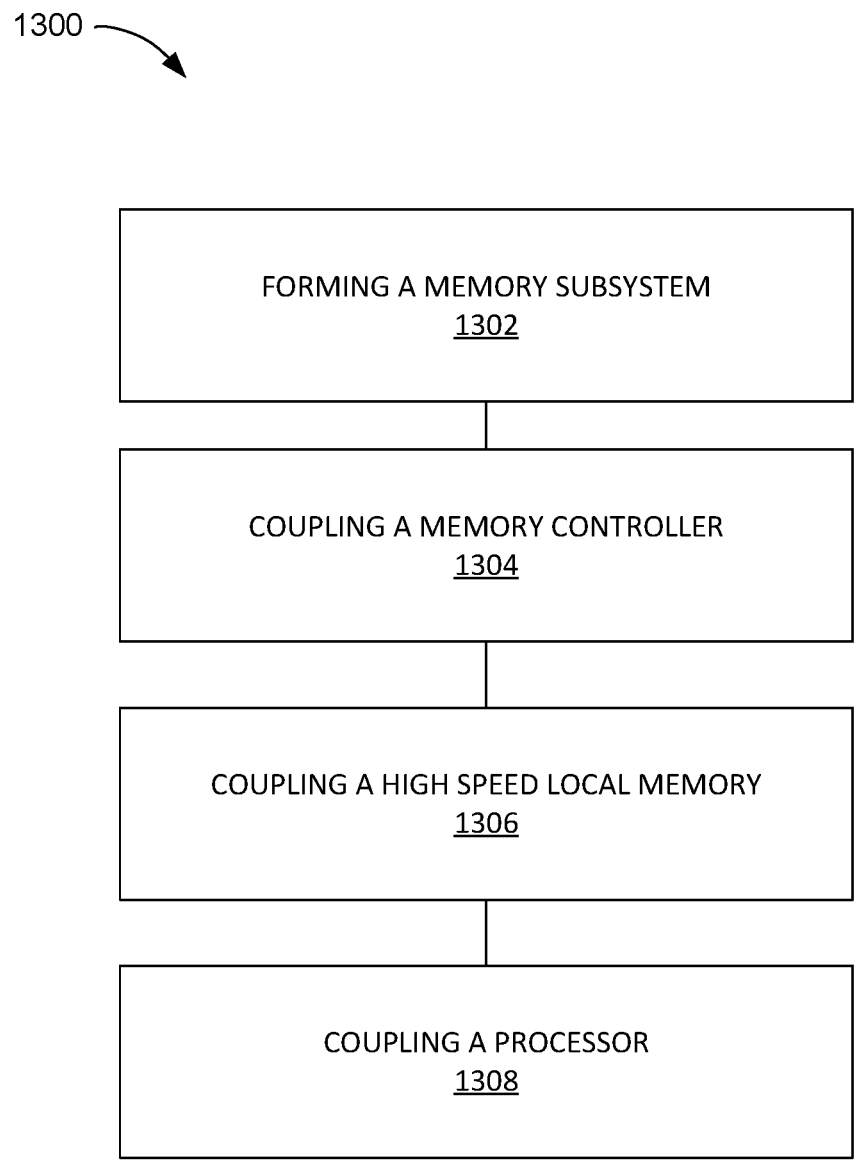
FIG. 13 is a flow chart of a method of manufacture of an electronic system in a further embodiment of the present invention.

Referring now to FIG. 13, therein is shown a flow chart of a method 1300 of manufacture of an electronic system 100 in a further embodiment of the present invention. The method 1300 includes: forming a memory subsystem 116 including: providing a first tier memory 118 configured to store operation data 113, with critical timing, by a fast control bus 124, and coupling a second tier memory 120 configured to store the operation data 113 with non-critical timing, by a reduced performance control bus 126 in a block 1302; coupling a memory controller 114 to the memory subsystem 116 by the fast control bus 124 and the reduced performance control bus 126 in a block 1304; coupling local cache memory 112 to the memory controller 114 and the memory subsystem 116 in a block 1306; and coupling a processor 104 configured to access operation data 113 in a block 1308.

Figure 14:
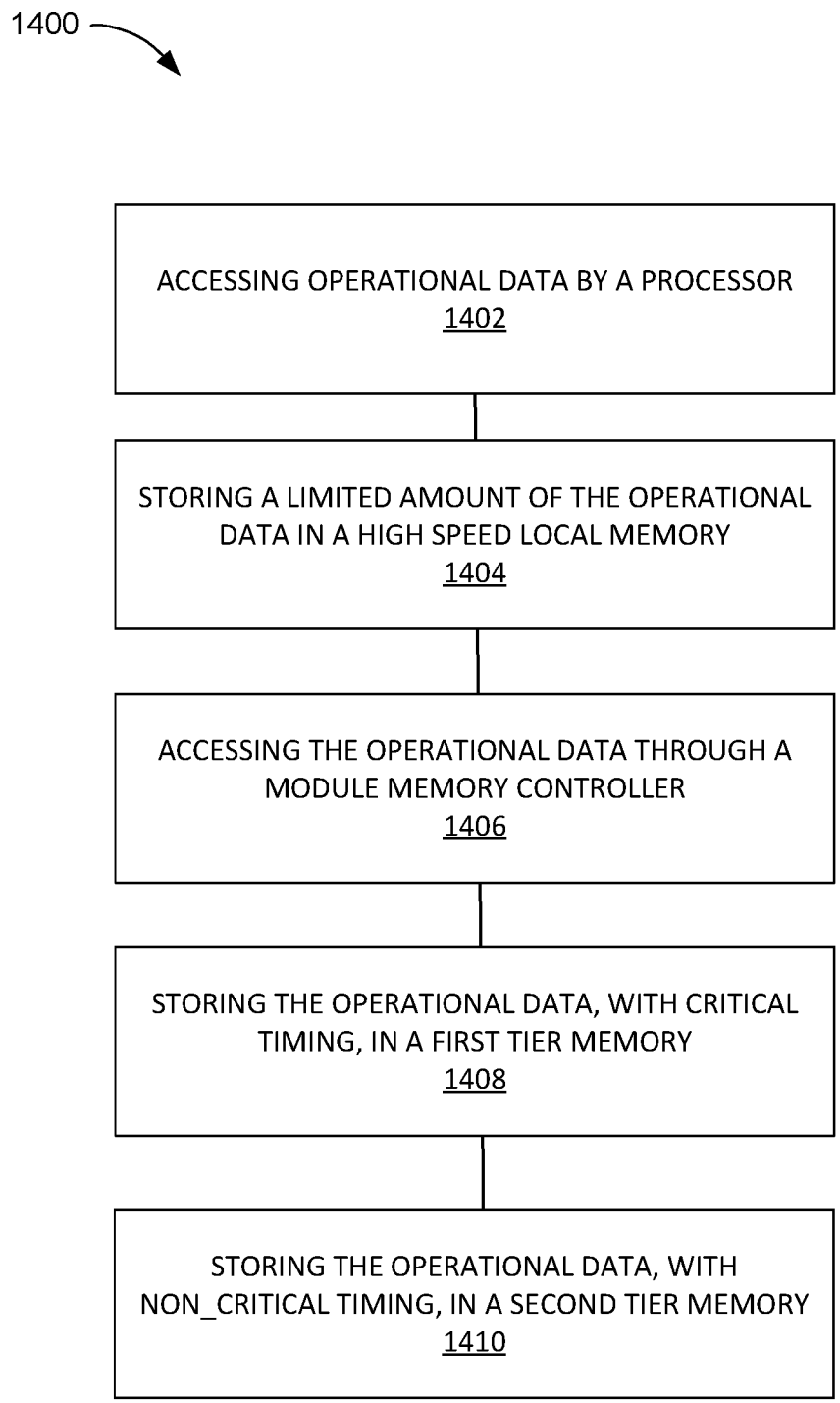
FIG. 14 is a flow chart of a method of operation of an electronic system in a further embodiment of the present invention.

Referring now to FIG. 14, therein is shown a flow chart of a method 1400 of operation of an electronic system 100 in a further embodiment of the present invention. The method 1400 includes: accessing operation data 113 by a processor 104 in a block 1402; storing a limited amount of the operation data 113 in a high speed local memory 105 in a block 1404; accessing the operational data 113 for the processor 104 and the high speed local memory 105 through a module memory controller 510 in a block 1406; storing the operation data 113, with critical timing, in a first tier memory 118 by a local cache controller 512 in a block 1408; and storing the operation data 113, with non-critical timing, in a second tier memory 120 by loading the operational data 113 through the local cache controller 512 to a memory tier controller 514 for accessing the second tier memory 120 in a block 1410.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level. While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims.

All matters set forth herein or shown in the accompanying drawings are to be interpreted in an illustrative and non-limiting sense.

What is claimed is:

1. An electronic system comprising:
   a processor configured to access operation data;
   a high speed local memory, coupled to the processor, configured to store a limited amount of the operation data; and
   a memory subsystem, coupled to the high speed local memory, including:
      a module memory controller configured to access the operational data for the processor and the high speed local memory,
      a local cache controller, coupled to the module memory controller, including a fast control bus configured to store the operation data, with critical timing in a first tier memory, and
      a memory tier controller, coupled to the local cache controller, including a reduced performance control bus configured to store the operation data with non-critical timing in a second tier memory.

2. The system as claimed in claim 1 wherein the second tier memory provides more capacity and longer latency than the first tier memory.

3. The system as claimed in claim 1 wherein the second tier memory includes a modified local bit-line sense amplifier having a bit-line feedback circuit.

4. The system as claimed in claim 1 wherein the second tier memory includes a global word-line driver coupled to a storage cell array.

5. The system as claimed in claim 1 wherein the second tier memory includes a storage cell array with a poly-silicon interconnect for a bit-line (BL).

6. The system as claimed in claim 1 wherein the memory subsystem is configured to provide the first tier memory as a hardware cache to the second tier memory.

7. The system as claimed in claim 1 wherein the memory subsystem is configured to provide a software tiering mechanism between the first tier memory and the second tier memory.

8. The system as claimed in claim 1 wherein the memory subsystem is configured to provide a remote software tiering mechanism between the first tier memory, coupled to the processor, and the second tier memory, coupled to a remote processor.

9. The system as claimed in claim 1 wherein the memory subsystem is configured to provide an integrated memory including the first tier memory and the second tier memory.

10. The system as claimed in claim 1 further comprising an interface adapter, between the first tier memory, accessed by the processor, and the second tier memory, accessed by a remote processor, for providing a remote software tiering mechanism.

11. An method of operation of an electronic system comprising:
    accessing operation data by a processor;
    storing a limited amount of the operation data in a high speed local memory;
    accessing the operational data for the processor and the high speed local memory through a module memory controller;
    storing the operation data, with critical timing, in a first tier memory by a local cache controller; and
    storing the operation data, with non-critical timing, in a second tier memory by loading the operational data through the local cache controller to a memory tier controller for accessing the second tier memory.

12. The method as claimed in claim 11 further comprising configuring the first tier memory as a hardware cache to the second tier memory.

13. The method as claimed in claim 11 further comprising configuring a software tiering mechanism between the first tier memory and the second tier memory managed by the processor.

14. The method as claimed in claim 11 further comprising configuring a remote software tiering mechanism between the first tier memory, coupled to the processor, and the second tier memory, coupled to a remote processor.

15. The method as claimed in claim 11 further comprising providing an integrated memory by accessing the second tier memory and an extension of the first tier memory including controlling the integrated memory through the module memory controller.

16. The method as claimed in claim 11 further comprising providing a remote software tiering mechanism by accessing an interface adapter between the first tier memory, accessed by the processor, and the second tier memory, accessed by a remote processor.

* * * * *